United States Patent [19]

Driskell

[11] 3,746,782

[45] July 17, 1973

[54] SHRUNKEN RASTER WITH IMAGE INSETTING

[75] Inventor: Carl R. Driskell, Winter Park, Fla.

[73] Assignee: The United States of America as represented by the Secretary of the Navy, Washington, D.C.

[22] Filed: Nov. 4, 1971

[21] Appl. No.: 195,718

[52] U.S. Cl. ...... 178/6.8, 178/DIG. 6, 178/DIG. 35, 178/7.85

[51] Int. Cl. ........................ H04n 5/22, H04n 7/18

[58] Field of Search ...................... 178/6.8, DIG. 6, 178/DIG. 35

[56] References Cited

UNITED STATES PATENTS

| | | | |
|---|---|---|---|
| 3,612,761 | 10/1971 | Wolff | 178/DIG. 35 |
| 3,576,945 | 5/1971 | Ebeling | 178/DIG. 6 |
| 2,969,428 | 1/1961 | Wittlig | 178/DIG. 6 |

*Primary Examiner*—Howard W. Britton
*Attorney*—Richard S. Sciascia, John W. Pease et al.

[57] ABSTRACT

Means for insetting a foreground image in a background image in a television display. A combination of electronic and optical elements function to cut out a part of the background image the exact shape of the foreground image. The foreground image is then optically inserted in the cut-out space in the background image.

3 Claims, 1 Drawing Figure

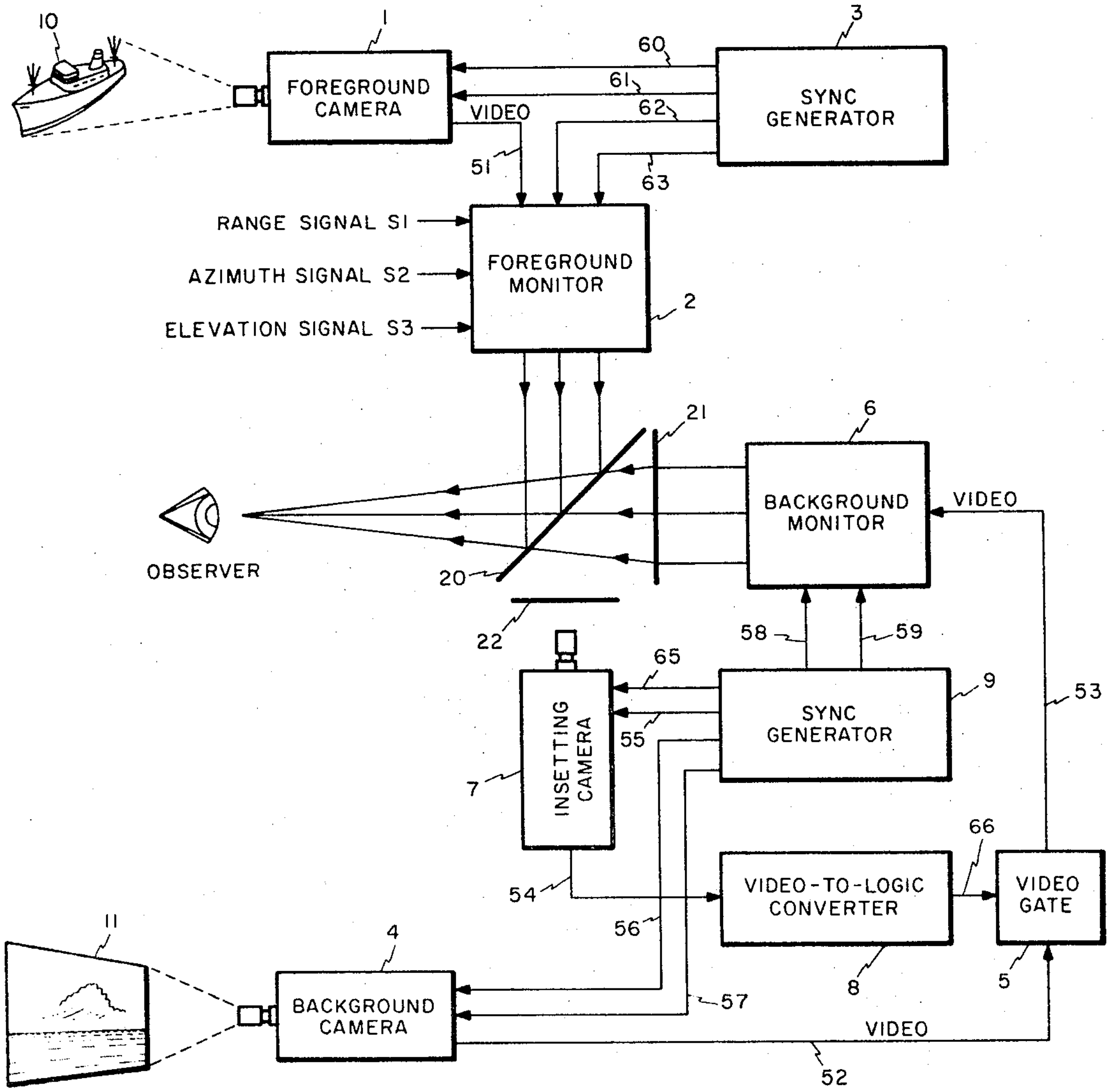
10
1
FOREGROUND CAMERA
3
60
61
62
SYNC GENERATOR
VIDEO
51
63
RANGE SIGNAL S1
AZIMUTH SIGNAL S2
ELEVATION SIGNAL S3
FOREGROUND MONITOR
2
21
6
BACKGROUND MONITOR
VIDEO
OBSERVER
20
22
58
59
65
INSETTING CAMERA
55
SYNC GENERATOR
9
53
7
66
54
VIDEO-TO-LOGIC CONVERTER
VIDEO GATE
56
11
4
8
5
BACKGROUND CAMERA
57
VIDEO
52

SHRUNKEN RASTER WITH IMAGE INSETTING

BACKGROUND OF THE INVENTION

The invention is in the field of television. Various training devices display a televised scene to simulate a training environment. One training device, a periscope view simulator taught in U. S. Pats. Nos. 3,420,953 and 3,479,454 to Hanns H. Wolff, synthesizes a training environment by inserting various foreground images in a background image on a TV display. In one case where the background image may represent a seascape and the foreground images may represent ships, planes, etc., means are provided to maneuver the ships, planes, etc., on the background to simulate naval training situations. Since the ships, etc., may change size, shape, and position on the background, complex equipment and procedures are required to synchronize the various images and to avoid overlapping and bleed-through of one image with respect to another. The invention provides improved means for inserting the foreground image in the background without overlapping, bleed-through, or loss of resolution, regardless of the maneuvers performed by the foreground image.

SUMMARY OF THE INVENTION

A foreground object such as a ship or other model is surveyed by a foreground television camera to provide video for a foreground monitor which displays a televised image of the foreground object. The displayed foreground image is observed by an "insetting" TV camera which supplies video to a video gate. A background scene is observed by a background TV camera which supplies video to the video gate. The insetting video signal gates the background video signal to a background monitor which displays a background scene having a part cut out in the shape of the foreground object. A beam splitter is positioned between the foreground monitor and the background monitor in such way that an observer looking at the background monitor through the beam splitter sees a complete picture including the foreground image optically inserted in the cutout in the background image.

BRIEF DESCRIPTION OF THE DRAWING

The drawing is a block diagram of the invention.

DESCRIPTION OF THE PREFERRED EMBODIMENT

Referring to the drawing, a foreground camera 1 views a foreground object (here a ship model) 10 and feeds a video signal representative of the object image over a line 51 to a foreground monitor 2. Foreground monitor 2 is provided with linear sweep generators which drive linear deflection amplifiers. The linear deflection amplifiers of monitor 2 have provisions for external and simultaneous control of horizontal and vertical sweep amplitudes (raster size) and individual control of horizontal and vertical sweep DC offsets (raster centering). The raster centering controls have sufficient range to deflect the entire raster completely off the monitor screen in any direction. The size of the scanned raster is controlled by a range signal S1, the horizontal position is controlled by an azimuth signal S2 and the vertical position is controlled by an elevation signal S3. The foreground image on foreground monitor 2 is viewed as it is reflected by a beam splitter 20. To correct for the top-to-bottom inversinon of the mirror reflected image, monitor 2 is scanned vertically from bottom to top instead of from top to bottom in the conventional manner.

A background camera 4 views a background scene 11 and feeds over a line 52 a video signal of the background image to a video gate 5. If video gate 5 is not inhibited, the background video signal is fed over a line 53 to a background monitor 6. The background display of monitor 6 is viewed through a vertically polarized plate 21 and beam splitter 20.

An insetting camera 7 is used to electronically make a cutout in the background display in the following manner. Camera 7 views monitor 2 through a horizontally polarized plate 22 and beam splitter 20. Since the background scene is vertically polarized by plate 21, the portion of the background scene that is reflected by beam splitter 20 toward camera 7 is filtered out by horizontally polarized plate 22. Insetting camera 7 is scanned from top to bottom in a vertically reversed fashion to correct for the vertical sweep reversal of monitor 2. The video output signal of insetting camera 7 is fed over a line 54 to a video-to-logic converter 8 which provides an output signal over a line 66 to video gate 5 during the time that a video signal is present from insetting camera 7.

A sync generator 9 supplies line and field sync signals to insetting camera 7 over lines 65 and 55, to background camera 4 over lines 56 and 57, and to background monitor 6 over lines 58 and 59. Sync generator 3 provides line and field sync signals to foreground camera 1 over lines 60 and 61 and to foreground monitor 2 over lines 62 and 63. By using separate sync generators, the foreground and background images may be displayed on rasters having different line and/or field rates. If the line and field rates of the background and foreground rasters are the same, common sync generator 3 may be used to supply line and field sync signals to all cameras and monitors.

What is claimed is:

1. In a device having a television system to display foreground images on a background image to simulate an environment, the improvement comprising:
   - a foreground object,
   - a foreground camera positioned to observe said object and to generate video signals representing said object,
   - a foreground monitor connected to receive said video signals and to display an image of said object,
   - a background scene,
   - a background camera positioned to observe said background scene and to generate background video signals representing said background,
   - a background monitor connected to receive said background video signals and to display an image of said background,
   - an insetting camera positioned to observe said image of said object and to generate video signals representing said image of said object,
   - a video gate connected to pass background video signals from said background camera to said background monitor,
   - means connecting the output of said insetting camera to said video gate to inhibit the passage of background video signals through said gate when said insetting camera has a video output signal to form a cutout in said background image in the shape of said foreground object, optical means for inserting said foreground image in said cutout in said background image, said optical means including a beam splitter positioned in the optical path between said foreground monitor and said insetting camera, and in the optical path between said background monitor and an observer's position.

2. The apparatus of claim 1, said optical means including polarizing means for excluding said background image from the field of view of said insetting camera.

3. The apparatus of claim 2, said polarizing means including a first polarizing plate positioned between said background monitor and said beam splitter, a second polarizing plate positioned between said insetting camera and said beam splitter, said polarizing plates being oriented to exclude said background image from the view of said insetting camera.

* * * * *